Feb. 23, 1943.   E. J. MARTIN   2,311,952
MAGNETIC INDICATOR
Filed Oct. 27, 1941
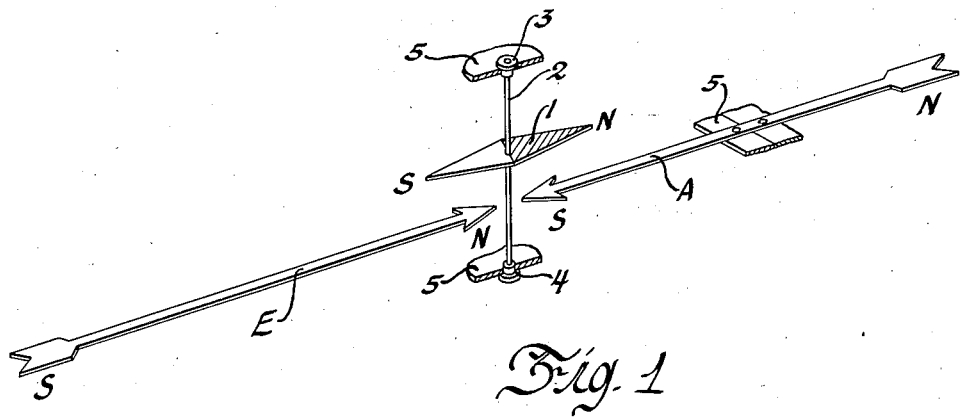
Fig. 1
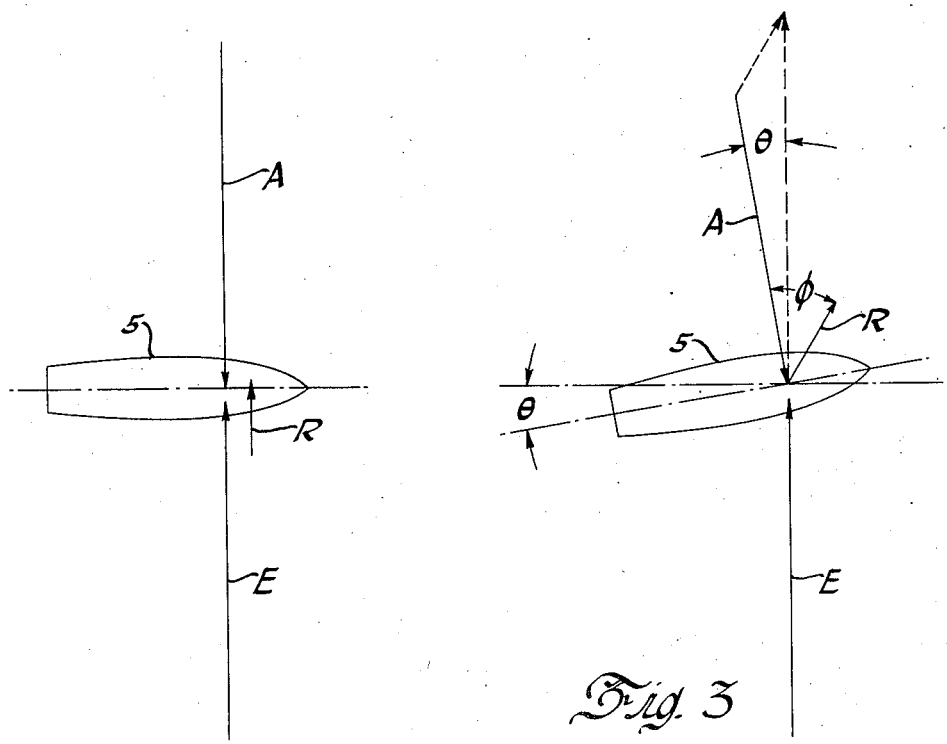
Fig. 2
Fig. 3
Inventor
Edward J. Martin
By Blackmore, Spencer & Flint
Attorneys Patented Feb. 23, 1943

2,311,952

UNITED STATES PATENT OFFICE 2,311,952

MAGNETIC INDICATOR

Edward J. Martin, Royal Oak, Mich., assignor to General Motors Corporation, Detroit, Mich., a corporation of Delaware Application October 27, 1941, Serial No. 416,621

2 Claims. (Cl. 33—222)

This invention relates to magnetic compasses and especially to magnetic compasses suitable for detecting small deflections from a fixed direction. More particularly, it relates to a magnetic indicator for detecting small deflections of a craft from a predetermined course.

In craft provided with automatic steering means controlled by a magnetic compass, a predetermined set course can only be maintained to the extent that the magnetic compass is sensitive to small deflections from the set course.

The object of the invention is a magnetic compass providing an increased or exaggerated indication of a deflection from a predetermined set direction, and thereby of increased sensitivity to the extent that the actual deflection is magnified.

The above and other objects of the invention will be apparent as the description proceeds.

According to the invention, an auxiliary magnet is mounted on the craft in a position of orientation relative to the axis of pivotation of the compass needle, such that the magnetic field of the auxiliary magnet directly opposes the earth's magnetic field when the craft is on its predetermined set course, and the horizontal force components of the opposing fields control the compass needle.

Upon an angular deflection of the craft from its set course, there is a like angular deflection of the horizontal force component of the auxiliary field, but a greater change in the direction of the resultant of the horizontal force components of the opposing fields, and consequently of the magnetic compass needle, which at all times sets itself in the direction of this resultant.

The drawing shows an arrangement according to the invention.

In the drawing:

Figure 1 is a perspective view of the essential elements and their arrangement when the craft in which they are installed is on a predetermined set course, whatever that course may be.

Figure 2 is a vector diagram of the horizontal force components of the opposing fields and the magnetic compass needle, in relation to a craft on a certain predetermined set course.

Figure 3 is a vector diagram similar to Figure 2 when the craft thereof has been deflected from its set course, through an angle $\theta$.

The magnetic compass needle 1 has an axis of pivotation constituted by a vertical spindle 2, on which it is mounted, and which is freely pivoted in bearings 3 and 4, suitably supported on a craft 5. It will be understood, of course, that the compass needle 1 is accurately adjusted or fully corrected (i. e., that it is such as to provide a correct indication of any course and that it is fully compensated in a well known way to insure its correctness, if any such compensation is required).

The auxiliary magnet A, which is preferably adjustably mounted on the craft 5, for orientation in any desired position about the axis of pivotation of the compass needle, but may constitute a predetermined part of the craft structure, is secured to the craft in that position of orientation in which its magnetic field directly opposes the earth's magnetic field when the craft is on its predetermined set course. In other words, the auxiliary magnet is so oriented about the axis of pivotation of the magnetic compass needle that the horizontal force component of its magnetic field lies north and south and opposes the earth's field when the ship is on its predetermined course. This condition is represented in perspective in Figure 1 and diagrammatically in Figure 2, whatever the predetermined course of the craft may be. The arrow E represents the horizontal force component of the earth's field, and the arrow A represents the horizontal force component of the magnetic field of the auxiliary magnet which has been so disposed in relation to the craft and its predetermined course that it directly opposes the arrow E representing the horizontal force component of the earth's field. In this circumstance the magnetic compass needle is oriented in a north and south direction, which is the direction of the resultant R of the opposite horizontal force components of the two opposing fields as shown in Figure 2.

If now the craft turns through an angle from its predetermined course, the horizontal force component of the magnetic field of the auxiliary magnet will no longer directly oppose the earth's field. This condition is shown in Figure 3, in which the vector A represents the horizontal force component of the magnetic field of the auxiliary magnet, and the vector E represents the horizontal force component of the earth's field. In this figure the craft, and with it the auxiliary magnet, and hence also its horizontal force component, is assumed to have been turned through an angle $\theta$ from its predetermined set course, and it will be appreciated that the resultant R of the vectors E and A, along which the magnetic compass needle at all times sets itself, moves as shown through an angle $\phi$ which represents the movement of the magnetic compass needle relatively to the craft, and is greater than $\theta$.

The increase in sensitivity secured by the arrangement, i. e., the ratio of $\phi$ to $\theta$ depends on the relative strengths of the two opposing fields and is greatest when these are equal, but is limited by the resultant field intensity which can be tolerated by the compass.

I claim:

1. A magnetic compass to give an exaggerated indication of the angular deflection of a craft from a predetermined set course, including a freely pivoted magnetic compass needle, and an auxiliary magnet oriented about the axis of pivotation of the compass needle in a position in which it lies north and south in relation to the craft and its predetermined course, whereby the horizontal force component of the magnetic field of the auxiliary magnet directly opposes the horizontal force component of the earth's magnetic field, and the compass needle is similarly oriented north and south along the resultant of the said force components, and upon an angular deflection of the craft from its predetermined course, the resultant of said force components, and hence the compass needle, moves through an angle greater than the actual angular deflection of the craft from its said predetermined course.

2. A magnetic compass to give an exaggerated indication of the angular deflection of a craft from a predetermined set course, including a freely pivoted magnetic compass needle and an auxiliary magnet adjustably mounted on the craft for orientation in any desired position about the axis of pivotation of the compass needle whereby when said auxiliary magnet is secured in a position in which it is oriented north and south in relation to the craft and its predetermined course, the horizontal force component of the magnetic field of the auxiliary magnet directly opposes the horizontal force component of the earth's magnetic field, and the compass needle is similarly oriented north and south along the resultant of the said force components, and upon an angular deflection of the craft from its predetermined course, the resultant of said force components, and hence the compass needle, moves through an angle greater than the actual angular deflection of the craft from its said predetermined course.

EDWARD J. MARTIN.